United States Patent Office 2,980,577
Patented Apr. 18, 1961

2,980,577
NEMATOCIDE

Morris L. Nielsen, Dayton, Ohio, assignor to Monsanto Chemical Company, St. Louis, Mo., a corporation of Delaware No Drawing. Original application May 14, 1957, Ser. No. 658,963. Divided and this application Jan. 18, 1960, Ser. No. 2,806

8 Claims. (Cl. 167—22)

This invention relates to thiocarbonates, to methods of making the same, and to the use of such compounds as nematocides. This invention is a division of my copending application Serial No. 658,963, filed May 14, 1957.

The nematode is an important economic pest, which is of widespread occurrence in soils throughout the world. Nematodes are considered responsible for field crop losses to the value of several hundred million dollars annually in the United States alone. The problem of eradication of nematodes demands a soil fumigant which will be an effective nematocide and yet will either be completely non-phytotoxic and/or rapidly eliminated from the soil, so as not to interfere with subsequent planting.

According to the present invention, new and effective, substantially non-phytotoxic compositions are provided for the control of nematodes and other undesirable biological organisms.

In the parent application, Serial No. 496,053, filed March 22, 1955, the erroneous conclusion was reached that only two new types of compounds were produced or could be produced by the new method or equivalent methods described, namely compounds of the formula

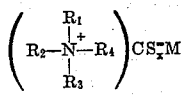

or of the formula

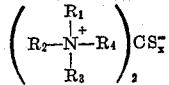

wherein the various terms are as defined below in defining the actual new compounds of the invention.

Recently, the surprising discovery was made that actually none of the compounds of the second formula above were produced. Rather, the new compounds provided by the present invention have the general formula

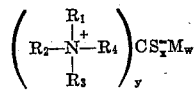

where $x$ is an integer of from 3 to 4, $y$ is greater than 0 and less than 2 and the sum of $w+y$ is equal to 2, $R_4$ is a hydrocarbon radical, $R_1$, $R_2$, and $R_3$ taken separately are hydrocarbon or substituted hydrocarbon radicals, and $R_1$, $R_2$, and $R_3$ taken together represent the non-metallic atoms necessary to complete a heterocyclic ring of which the nitrogen is a member, and M is selected from the group consisting of ammonium, alkali metal, and alkaline earth metal ions. By the above formula it is intended to cover by $y$ fractional and integral, namely, numbers between 0 and 2, since the experimental work has definitely indicated that they can be produced as will be indicated below. The compounds are quaternary ammonium salts of trithiocarbonic and tetrathioperoxycarbonic acids, and are readily prepared by reaction of a quaternary ammonium halide or hydroxide with a salt of a thiocarbonic acid.

In preparing the present compounds, there may be used any readily available thiocarbonic acid salt of an alkali metal, alkaline earth metal, or ammonium. Examples of trithiocarbonates useful in preparing the compounds of the invention are: ammonium trithiocarbonate, potassium trithiocarbonate, lithium trithiocarbonate, sodium trithiocarbonate, calcium trithiocarbonate, barium trithiocarbonate, etc. Reaction of the trithiocarbonates with the quaternary ammonium compounds gives quaternary ammonium salts of trithiocarbonic acid, in conformance with the above formula where $x$ is equal to 3. To prepare the quaternary ammonium salts of tetrathioperoxycarbonic acid, of the above formula where $x$ is equal to 4, a tetrathioperoxycarbonic acid salt of ammonium, an alkali metal or an alkaline earth metal may be reacted with quaternary ammonium compound, or a mole of a trithiocarbonate salt of a quaternary ammonium compound may be reacted with a mole of sulfur. Examples of inorganic tetrathioperoxycarbonates useful in preparing the tetrathioperoxycarbonate quaternary ammonium salts of the invention are ammonium tetrathioperoxycarbonate, sodium tetrathioperoxycarbonate, lithium tetrathioperoxycarbonate, potassium tetrathioperoxycarbonate, calcium tetrathioperoxycarbonate, magnesium tetrathioperoxycarbonate, etc. Alternatively, the trithiocarbonates and tetrathioperoxycarbonates to be used in preparing the compounds of the invention may be prepared in situ, by reaction of, e.g., sodium sulfide and carbon disulfide, to prepare trithiocarbonate salts, and by reaction of sodium disulfide, or an equimolecular mixture of sodium sulfide and sulfur, with carbon disulfide to prepare the tetrathioperoxycarbonate salts.

The quaternary ammonium compounds useful in preparing the present thiocarbonate salts are the monomeric or polymeric hydroxides or halides of compounds containing a pentavalent nitrogen atom in which a wide variety of hydrocarbon radicals may occupy the four valences of nitrogen other than that bonded to the hydroxide or halide ion. It will generally be preferred that at least one of the valences of the nitrogen atoms be satisfied by an aromatic, aliphatic or long-chain alkyl group. The hydrocarbon radicals attached to the quaternary nitrogen group may, if desired, contain substituents such as do not interfere with the course of the desired reaction. Examples of useful quaternary ammonium hydroxides are, for example, alkylammonium hydroxides such as decyltrimethylammonium hydroxide, dodecyltrimethylammonium hydroxide, hexadecyltrimethylammonium hydroxide, hexadecyldimethylethylammonium hydroxide, octadecyldimethylethylammonium hydroxide, etc.; alkenyl ammonium hydroxides such as 9-octadecenyldimethylethylammonium hydroxide, octadecadienyloctadecenyldimethylammonium hydroxide, 9-otcadecenyltrimethylammonium hydroxide, etc.; alkylaralkylammonium hydroxides, such as hexadecyldimethylbenzylammonium hydroxide, octadecyldimethylbenzylammonium hydroxide, dodecyldimethylbenzylammonium hydroxide, etc. Examples of presently useful quaternary ammonium halides are, e.g., alkylammonium halides such as hexadecyltrimethylammonium bromide, hexadecyldimethylethylammonium bromide, octadecyldimethylethylammonium bromide, etc.; alkenylammonium halides such as octadecenyldimethylethylammonium bromide, octadecadienyltrimethylammonium bromide, octadecenyltrimethylammonium bromide, etc.; alkylaralkylammonium halides such as hexadecyldimethylbenzylammonium chloride, dodecyldimethylbenzylammonium chloride, tetradecyldimethylbenzylammonium chloride, etc.; and pyridinium compounds such as dodecylpyridinium chloride, hexadecylpyridinium bromide, hexadecylpyridinium chloride, etc. Polymeric quaternary ammonium compounds, such as poly-N-methyl-2-methylpyridinium hydrogen phosphate, etc., may also be reacted with thiocarbonates to produce the quaternary ammonium compounds of the invention.

In preparing the compounds of the invention, the thiocarbonate salts are simply contacted with the quaternary ammonium compounds. To facilitate the isolation of the quaternary ammonium thiocarbonate product, it is preferred to conduct the reaction in a non-aqueous solvent medium, from which the quaternary ammonium thiocarbonates can be precipitated. Examples of suitable solvents for the preparation of the quaternary ammonium thiocarbonates of the invention are methanol, ethanol, isopropanol, etc. Reaction is generally substantially completed simply by mixing the reactants well, for a period of from a minute to several hours. It is preferred not to heat the reactants, or to apply only gentle heating to the reaction, to avoid decomposition. Sub- or superatmospheric pressures and catalysts may be used if desired during the reaction.

To isolate the reaction products, in order to obtain maximum yields, we prefer to cool the reaction mixture and to add to it liquids which are non-solvents for the product quaternary ammonium thiocarbonates. The products generally precipitate readily, and can be isolated by decanting off the supernatant liquid mixture, or by filtering.

The composition of the product trithiocarbonate or tetrathioperoxycarbonates produced can be varied within the limits expressed broadly above by varying the ratio of reactants and/or the amount and ratio of solvent and non-solvent used in preparing the products of the invention. The molar ratios of reactants can be varied from about 1 to 100 to about 100 to 1 or even more of the thiocarbonate reactant to the quaternary reactant, depending on the particular product desired, and correspondingly the ratio of reactants can be varied, if the in situ method is used. The amount of solvent and non-solvent and the ratio thereof can be varied appreciably from that actually used in the experimental data set forth below. In general, it appears that the use of less solvent and non-solvent favors the production of a product containing a higher percentage of the quaternary component.

The quaternary ammonium trithiocarbonates and tetrathioperoxycarbonates of this invention are yellow to reddish-colored products which range from waxy crystalline materials to greases and oils. They are useful for a variety of agricultural and industrial applications; for example, they may be used as rubber additives, as waterproofing agents for proteinaceous glues, etc.; they are generally biological toxicants, and may be used as bactericides, herbicides, fungicides, etc.; and they possess particularly outstanding activity as nematocides.

The invention is further illustrated, but not limited, by the following examples.

EXAMPLE 1

A solution of 15 g. of sodium trithiocarbonate in 100 ml. of ethanol was mixed with a solution of 25 g. of hexadecyltrimethylammonium bromide in 200 ml. of ethanol, by stirring. Then 200 ml. of ether were added to the reaction mixture, and the solution cooled in an ice-salt bath; on standing, a yellow solid separated. The solid was filtered off, washed with ether, dried, and weighed: the yield was 5 grams. A further amount of product could be separated from the filtrate by treatment with ether. The product analyzed as follows:

|  | Found |
|---|---|
| Percent C | 54.53 |
| Percent S | 34.51 |
| Percent H | 10.31 |

The formula of the product is calculated from the carbon and sulfur analysis as follows:

$$C/S = 54.53/34.51 = 1.581$$

$$\frac{228y + 12}{96} = 1.581$$

$y = 0.613$ or approximately 0.6
$W = 2 - y = 1.4$ giving a product of the following approximate formula within normal experimental error:

$$Na_{1.4}(C_{19}H_{42}N)_{0.6}CS_3$$

The sodium content of the sodium hexadecyltrimethyl trithiocarbonate was also indicated by a flame test on the salt, which gave the typical yellow color characteristic of sodium salts, and by ignition residue.

EXAMPLE 2

A solution of 40 g. of hexadecyltrimethylammonium bromide in 200 ml. ethanol was prepared by gentle heating, and to this alcoholic solution were added 23 g. of sodium trithiocarbonate in 125 ml. of ethanol. The mixture was stirred, 175 ml. of ether were added, and the reaction mixture was cooled in an ice-salt bath for four hours. The yellow solid which separated was filtered off under nitrogen, washed with ether, and dried under nitrogen and in a desiccator. The product weighed 35 g. The salt is stable to long storage under anhydrous conditions; it decomposes on heating it to 70° C.

|  | Found |
|---|---|
| Percent C | 48.73 |
| Percent H | 9.43 |
| Percent S | 16.96 |
| Percent N | 2.79 |

The formula of the product is calculated from the carbon and sulfur analysis, and checked by comparison with the nitrogen and sulfur analysis as follows:

$$C/S = 48.73/16.96 = 2.87$$

$$\frac{228y + 12}{96} = 2.87$$

$y = 1.157$
$N/S = 2.79/16.96 = 0.1645$ $$\frac{14y}{96} = 0.1645$$

$y = 1.130$
average $y = 1.143$ or approximately 1.1
$W = 0.9$ giving a product of the following approximate formula within normal experimental error:

$$Na_{0.9}(C_{19}H_{42}N)_{1.1}CS_3$$

In pre-emergence tests, this compound was shown to possess no phytotoxic effects on a wide spectrum of plants when applied at a rate of 25 pounds per acre.

EXAMPLE 3

As the quaternary ammonium starting material for this preparation, there was taken a dialkyl dimethyl quaternary ammonium chloride known to the trade as "Arquad 2C" and reputed to contain as the dialkyl portion of the compound a mixture of hydrocarbon radicals known as loralkyls, preponderantly composed of dodecyl radicals.

Forty grams of a solution of 75 percent by weight of diloralkyldimethylammonium chloride in isopropanol were mixed with a solution of 15 grams of sodium trithiocarbonate in 100 ml. of ethanol. The orange solid which separated was allowed to settle, and then the entire mixture was poured into five times its volume of water. The waxy precipitate was collected on a filter and dried in a vacuum desiccator: yield, 35 g. The product analyzed as follows:

| | Found |
|---|---|
| Percent S | 9.24 |
| Percent N | 2.32 | and had the following approximate formula as calculated from the N/S ratio of 0.251, namely $Na_{0.3}(diloralkyldimethylammonium)_{1.7}CS_3$

EXAMPLE 4

A solution of 45.5 g. (1/8 mole) of hexadecyltrimethylammonium bromide in 600 ml. of anhydrous ethanol was mixed, under nitrogen, with 1/8 mole of sodium disulfide and 10 g. of carbon disulfide and let stand for two days, whereupon the appearance of orange crystals was noted. The crystals were filtered off under nitrogen, washed with ether, and dried under nitrogen and in a vacuum desiccator; yield, 7 grams. A further crop of crystals could be obtained from the filtrate.

The product was soluble in alcohol and insoluble in water. The compound, after extraction with carbon disulfide to remove free sulfur, analyzed as follows:

| | Found |
|---|---|
| Percent C | 58.63 |
| Percent S | 21.35 |
| Percent H | 10.70 |

The formula of the product is calculated from the carbon and sulfur analysis as follows:

$$C/S = 58.63/21.35 = 2.75$$

$$\frac{228y+12}{128} = 2.75$$

$$y = 1.492 \text{ or } 1.5$$
$$W = 0.5$$

giving a product of the following approximate formula within normal experimental error:

$Na_{0.5}(C_{19}H_{42}N)_{1.5}CS_4$

EXAMPLE 5

Hexadecyltrimethylammonium hydroxide was prepared by treating a solution of 20 g. of the quaternary ammonium halide in 600 ml. of water with silver oxide and filtering. To the hydroxide was added an alcoholic solution of sodium tetrathioperoxycarbonate, and the flask containing the mixture was filled with nitrogen and let stand overnight. The yellow solid which separated was filtered off, washed with water, and dried in vacuum; yield, 17 g. The product decomposed on heating to 80–90° C.; after extraction with carbon disulfide to remove free sulfur, it analyzed as follows:

| | Found |
|---|---|
| Percent C | 61.55 |
| Percent S | 18.48 |
| Percent H | 10.88 | giving a product of the following approximate formula calculated from the C/S ratio of 3.33, namely $Na_{0.2}(C_{19}H_{42}N)_{1.8}CS_4$

EXAMPLE 6

Forty-six grams of "Arquad 2C," a 75 percent by weight solution of diloralkyldimethylammonium chloride in isopropanol, was mixed with a solution of 15 g. of sodium tetrathioperoxycarbonate in 200 ml. of ethanol, and the mixture was then poured into about a liter of distilled water. An orange, waxy solid separated; it was filtered off, washed with water, and dried under vacuum in a desiccator; after drying, the product weighed 35 g.

EXAMPLE 7

A solution of 19 g. of poly-N-methyl-2-methyl-5-vinylpyridinium p-toluene sulfonate in 800 ml. of water was mixed with 25 ml. of an ethanolic solution containing 1/8 mole of sodium trithiocarbonate. The gelatinous solid which separated was dried in a vacuum desiccator; after drying, 3 g. of a hard brown product were obtained.

EXAMPLE 8

$Ag_2O$ was prepared by slowly adding 0.82 g. of NaOH in water to 3.4 g. of $AgNO_3$ in water, and the $Ag_2O$ was recovered by filtration and thoroughly washed. To 3.64 g. of hexadecyltrimethylammonium bromide slurried in 27 ml. of water was added the wet freshly prepared $Ag_2O$ provision being made for the AgBr formed. A $N_2$ blanket was used to exclude $CO_2$. The product hexadecyltrimethylammonium hydroxide was recovered as a slightly hazy orange solution in water. To this product blanketed with $N_2$ was added 0.4 ml. (about 0.6 g.) of $CS_2$ with stirring. After about 1 hour another 0.4 ml. of $CS_2$ was added and the stirred mixture was warmed to 40° C. Soon crystals began to appear and the mixture was chilled in an ice bath to 5° C. The yellowish-orange crystals product were removed by filtration giving a product made up of long narrow platelet crystals. These crystals were difficultly soluble in water and slightly soluble in acetone. A melting point determination of the crystalline product gave foaming starting at 112° C. indicating decomposition.

EXAMPLE 9

To 80 g. (0.22 moles) hexadecyltrimethylammonium bromide dissolved in 200 ml. of ethyl alcohol was added 25 g. (0.11 moles) of $Na_2CS_3 \cdot 4H_2O$ dissolved in ethyl alcohol after removal by filtration of a small amount of the $Na_2CS_3 \cdot 4H_2O$ which did not dissolve. The mixed solutions were mixed thoroughly and cooled in an ice-salt bath. A yellow solid separated. The solid was separated by filtration and dried in a vacuum desiccator. Some of the sample was lost in handling so only 38 g. were recovered. An analysis of the solid yield the following results:

| | Found |
|---|---|
| Percent C | 48.66 |
| Percent H | 9.40 |
| Percent N | 2.38 |
| Percent S | 11.36 | giving a product of the approximate formula calculated as an average of the results obtained from the C/S and N/S ratios in the same manner as described in detail in experiments above which is as follows:

$Na_{0.6}(C_{19}H_{42}N)_{1.4}CS_3$

A melting point determination of the crystalline product gave foaming starting at 139.4° C. indicating decomposition.

X-ray diffraction patterns were obtained on the products of Examples 8 and 9, and the conclusions were that the products were definitely different and that the product of Example 8 could not contain an appreciable amount of the product of Example 9.

The above compounds were tested for biological activity as follows:

EXAMPLE 10

*Nematocidal activity of the thiocarbonates in aqueous suspension*

It is known that a nematode, when placed in water, flexes its body at a more or less constant rate, and that the effect of a nematocide can be estimated reasonably accurately by counting the rate of this flexing action. This motility is observed through a microscope, and the number of flexures counted, the effect of the nematocide being expressed as a percentage of the normal flexing rate of a control dispersion of nematodes not containing a nematocidal agent.

Emulsions of the thiocarbonates of Examples 2, 3, 5 and 6 were prepared by dissolving one gram of each of the samples in a few ml. of acetone, adding an emulsifying agent known to the trade as "Tween 20" and reputed to be a polyoxyethylene sorbitan monolaurate, and bringing the mixture up to 50 ml. with water, giving an aqueous emulsion containing 2 percent by weight of the thiocarbonate. Aqueous suspensions of the nematode *Panagrellus redivivis* were placed in Stender dishes, and concentrations of 0.1 percent and 0.01 percent of the various test chemicals, calculated on the volume of the nematode suspension, were added to the Stender dishes, after which the motility of the nematodes was estimated at regular intervals as compared to a control nematode suspension containing no thiocarbonate. The results of this test are shown in the following table:

| Motility after— | Product of— | | | | | | | | Control |
|---|---|---|---|---|---|---|---|---|---|
| | Example 2 | | Example 3 | | Example 5 | | Example 6 | | |
| | 0.1% | 0.01% | 0.1% | 0.01% | 0.1% | 0.01% | 0.1% | 0.01% | |
| 10 min | 2 | 100 | 1 | 95 | 5 | 10 | 0 | 5 | 100 |
| 20 min | 1 | 50 | 0 | 90 | 2 | 10 | 0 | 2 | 100 |
| 30 min | 0 | 25 | 0 | 90 | 1 | 8 | 0 | 2 | 100 |
| 60 min | 0 | 20 | 0 | 90 | 1 | 5 | 0 | 1 | 100 |
| 2 hours | 0 | 15 | 0 | 85 | 1 | 5 | 0 | 1 | 100 |
| 24 hours | 0 | 0 | 0 | 1 | 0 | 0 | 0 | 0 | 100 |

EXAMPLE 11

*Nematocidal activity of the thiocarbonates in soil*

Four batches of five hundred grams each of uninfected soil were placed in containers. The soil was then inoculated with the root-node nematode, Meloidogyne spp., by addition to each container of 25 ml. of a suspension prepared by grinding 2 g. of the washed roots of plants infected by the nematodes in 100 ml. of water. After inoculating the soil, sufficient water was added to bring the potting soil to field capacity. The four lots of infected soil were then treated with emulsions prepared as described above, to give, respectively, 0.01 and 0.001 percent concentrations in the soil of the thiocarbonates of Examples 3 and 5 as a drench; the containers were capped and allowed to stand one week, after which a two-week old Marglobe tomato seedling was transferred to each container. An untreated, but similarly inoculated, control was also planted. After a growing period of two months, the tomato plants were harvested and the roots washed and examined for evidence of infection.

Both at 0.01 percent and 0.001 percent concentrations, the product of Example 3 completely suppressed nematode infection in the plants grown in infected soil; at 0.01 percent concentration, the product of Example 5 completely suppressed nematode infection, and at 0.001 percent concentration, it held nematode infection of the plant roots down to a very light stage, compared to the heavy infection shown by roots of controls exposed to the infection without addition of a protective chemical, while exhibiting negligible phytotoxicity.

The present thiocarbonates are effective in eliminating or suppressing nematode activity when applied to the soil at the rate of 50–500 pounds per acre. Usually, concentrations of 100–200 pounds per acre will produce effective nematode control in soils of average infestation level. Lightly infected areas may be treated effectively with smaller concentrations. The compounds may be applied to the soils, e.g., as dusts, as compositions together with fertilizers, or by injection into the soil.

In addition to use in soils, the compositions of the invention may also be applied to other nematode environments, such as greenhouse potting mixtures, and other soil substitutes. The thiocarbonates of the invention are also useful in destroying animal endoparasitic worms, such as flukes and tapeworms during the soil phase in their life cycle, and may usefully be applied, e.g., to barnyards and other soils which it is desired to sterilize.

What is claimed is:
1. The method of controlling nematodes comprising exposing said nematodes to a toxic quantity of a nematocidal composition comprising as the essential active ingredient a quaternary ammonium thiocarbonate reaction product of a quaternary ammonium compound of the formula

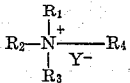

where $R_4$ is an alkyl hydrocarbon radical having not more than about 18 carbon atoms $R_1$, $R_2$, and $R_3$ are selected from the class consisting of alkyl hydrocarbon radicals having not more than 18 carbon atoms when taken separately and when taken together the carbon and hydrogen atoms necessary to form the pyridine nucleus of which the nitrogen is a member, and Y is selected from the class consisting of the hydroxy and halide anions, with a salt selected from the class consisting of the ammonium, alkali metal and alkaline earth metal salts of trithiocarbonic acid and tetrathioperoxycarbonic acid.

2. The method of claim 1 wherein said quaternary ammonium compound consists essentially of didodecyl dimethylammonium chloride and said salt is sodium trithiocarbonate.

3. The method of claim 1 wherein said quaternary ammonium compound consists essentially of didodecyl dimethylammonium chloride and said salt is sodium tetrathioperoxycarbonate.

4. The method of claim 1 wherein said quaternary ammonium compound is hexadecyltrimethylammonium bromide and said salt is sodium trithiocarbonate.

5. The method of claim 1 wherein said quaternary ammonium compound is hexadecyltrimethylammonium hydroxide and said salt is sodium tetrathioperoxycarbonate.

6. The method of controlling nematodes in soil which comprises treating said soil with a toxic quantity of a nematocidal composition comprises as the essential effective ingredient a quaternary ammonium thiocarbonate reaction product of a quaternary ammonium compound of the formula

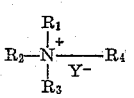

where $R_4$ is an alkyl hydrocarbon radical having not more than about 18 carbon atoms, $R_1$, $R_2$, and $R_3$ are selected from the class consisting of alkyl hydrocarbon radicals having not more than 18 carbon atoms when taken separately and when taken together the carbon and hydrogen atoms necessary to form the pyridine nucleus of which the nitrogen is a member, Y is selected from the class consisting of hydroxy and halide anions, with a salt selected from the class consisting of the ammonium, alkali metal and alkaline earth metal salts of trithiocarbonic acid and tetrathioperoxycarbonic acid.

7. The method of claim 6 wherein said quaternary ammonium compound consists essentially of didodecyl dimethylammonium chloride and said salt is sodium trithiocarbonate.

8. The method of claim 6 wherein said quaternary ammonium compound is hexadecyltrimethylammonium hydroxide and said salt is sodium tetrathioperoxycarbonate.

References Cited in the file of this patent

UNITED STATES PATENTS

| 2,388,468 | Compton | Nov. 6, 1945 |
| 2,479,850 | Marks | Aug. 23, 1949 |
| 2,772,310 | Morris | Nov. 27, 1956 |
| 2,813,904 | Lott | Nov. 19, 1957 |
| 2,853,414 | Wimmer | Sept. 23, 1958 |

UNITED STATES PATENT OFFICE
CERTIFICATE OF CORRECTION

April 18, 1961

Patent No. 2,980,577

Morris L. Nielsen

It is hereby certified that error appears in the above numbered patent requiring correction and that the said Letters Patent should read as corrected below.

Column 1, lines 37 to 40, the right-hand portion of the formula, for "$CS_x^-M$" read -- $CS_x^=M$ --; lines 42 to 45, the right-hand portion of the formula, for "$CS_x^-$" read -- $CS_x^=$ --; column 2, line 55, for "9-otcadecenyltri-" read -- 9-octadecenyltri- --.

Signed and sealed this 22nd day of January 1962.

(SEAL)
Attest:

ERNEST W. SWIDER
Attesting Officer

DAVID L. LADD
Commissioner of Patents